Oct. 19, 1954  E. C. JANES  2,691,806

METHOD AND APPARATUS FOR FORMING POTTERY CUP HANDLES

Filed June 16, 1950

*Inventor*
E. C. Janes
By Fetherstonhaugh & Co.
*Attorneys*

Patented Oct. 19, 1954

2,691,806

UNITED STATES PATENT OFFICE 2,691,806

METHOD AND APPARATUS FOR FORMING POTTERY CUP HANDLES

Edgar Cecil Janes, Montreal, Quebec, Canada, assignor to Medalta Potteries Ltd., Medicine Hat, Alberta, Canada, a corporation of Alberta Application June 16, 1950, Serial No. 168,397

11 Claims. (Cl. 25—22)

This invention relates to improvements in method and apparatus for forming pottery cup handles which are an integral part of the cups.

The principal object of this invention is to manufacture cups with handles by preforming a solid handle with the cup during moulding and then shaping the handle by a stamping operation.

One conventional method of manufacturing cups is to preform the bowl portion and then attach a handle to the preformed bowl. This is done by rolling a piece of clay to form an elongated shape about a quarter to a half-inch in thickness and is stuck onto the cup itself. However, the health authorities found that an attached handle, known in ceramics as a "block handle," is not very sanitary. This is because some handles are not firmly attached to the cups and a slight crack or imperfection might be a source of bacteria breeding. As a result of this, the health authorities began to insist on having the cups and handles made in one piece, without any sticking on, this type of handle being known in ceramics as a "sanitas" handle. This cup is either made in such a way that its handle is an integral part of the cup or it is stuck on and worked into the cups so nicely that it appears as if it is a solid part of it. Both cases are very complicated and slow up speed of production. These two operations are the only known operations today for the manufacture of the sanitas cup and handle.

In order that the present invention will be appreciated more fully, a brief outline of the two standard methods of making sanitas ware is hereinbelow described. The first deals with the manufacture of the handle as an integral part of the cup.

This procedure is most universal today. The mould required in this case would be a split mould. The clay is placed in the hollow of the handle and the two halves of the mould are put together forming a handle. The ends of the handle stick out into the mould. When the cup is formed the ends of the handle automatically adhere to the cup. When you open the two halves you have a cup with a handle attached to it. This procedure only complicates and slows up production. Split moulds cause unnecessary seams which have to be trimmed off and sponged off to make them unnoticeable to the eye. This automatically calls for a lot of extra unnecessary work. Also, the split mould is hard to handle, because it is made out of plaster, and the least bit of wear will cause the two halves not to fit properly together. This necessitates making special casings in which the two halves of the mould are placed to hold them together. This is the way a cup with a sanitas handle is made today and is three times as slow as the making of cups without handles.

To overcome this rather clumsy way of making cups another method was developed, as follows:

The cup is actually made in one solid mould, without a handle. This eliminates unnecessary seams and consequently unnecessary labour. The handle is made separately, either by casting it in special plaster moulds or by pressing it in metal dies. The handle is then stuck on to the cup and the point of contact is worked in very smoothly as to make it appear as if the handle is actually an integral part of the cup itself. This method, while it does eliminate a certain amount of unnecessary labour, is still slow and entails a lot of extra dies and moulds and also extra labour.

According to the present invention, the cup and handle are made in one piece in one solid mould. But, in order that the article can be removed from the plaster mould, the handle is moulded as a solid plastic mass. This cup with its solid handle attached is placed in a special machine and by means of dies under pressure, this handle, while in a plastic state, is punched out to form a properly shaped handle. This process eliminates unnecessary seams. It also eliminates the job of making handles separately and having them stuck on. In other words, by means of this invention, cups are manufactured with genuine sanitas handles almost as fast as other manufactured cups without handles.

Proceeding now to a more detailed description, reference will be had to the accompanying drawings, in which—

Figure 1:
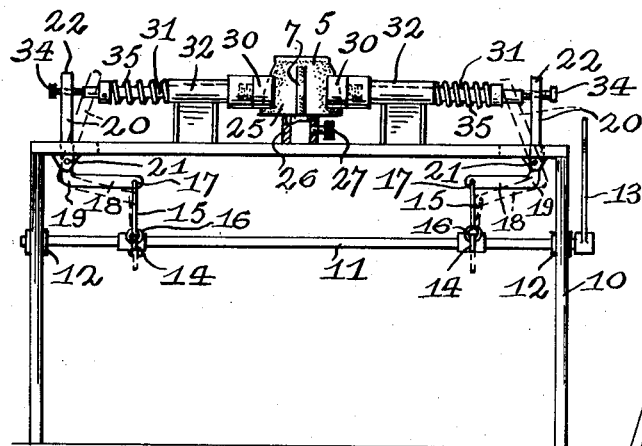
Figure 1 is a side elevational view of an apparatus embodying this invention.
Figure 2:
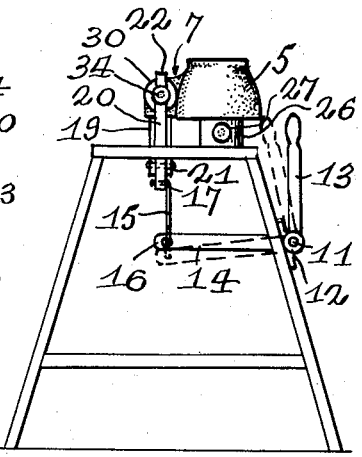
Figure 2 is an end view of the apparatus shown in Fig. 1.
Figure 3:
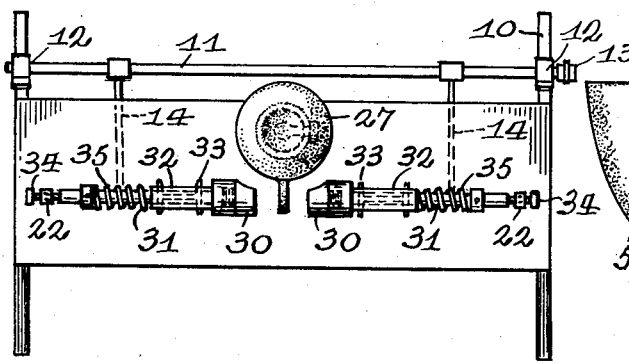
Fig. 3 is a top plan view.
Figure 4:
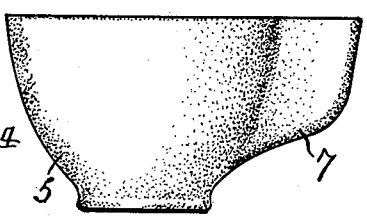
Fig. 4 is a side view of a cup showing a solid handle before the stamping out operation.
Figure 5:
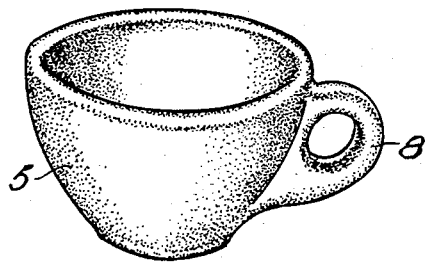
Fig. 5 is a view showing the finished product.

The cup 5 and solid handle 7 are first formed in a plaster mould (not shown). The mould has a slot in the side to permit a portion of the clay to be forced out to form a solid handle. When the formed cup of clay is dried to a leather hardness, the cup is removed from the mould. The cup 5, shown in Fig. 4, is placed on a machine for shaping the solid handle 7 as well as trimming the extra clay on the outside of the cup and handle, thus providing a finished handle 8 similar to the standard cup handles, as shown in Fig. 5.

The machine is mounted on a frame 10. A shaft 11 mounted to rotate in bearings 12 secured to one side of the frame has an operating lever 13 fixed thereon to rotate the shaft. A pair of lever arms 14 have one end fixed to rotate with shaft 11, each having its free ends pivotally connected to the lower end of a link 15, as indicated at 16. The upper end of link 15 is pivotally connected, as indicated at 17, to the free end of one arm 18 of an L-shaped lever 19. Each lever 19 has its arm 18 normally disposed in a horizontal plane and its other arm 20 extending vertically from arm 18 and pivotally connected, intermediate its length, to frame 10, as indicated at 21, so that the upper free ends 22 will be moved toward or away from each other by rotation of each lever 19 about its pivotal axis 21.

A plug or churn 25 is mounted on a base 26 carried by the frame 10. When the cup with solid handle is removed from a mould it is placed over the plug with the handle 7 projecting to one side. A set screw 27 permits vertical adjustment of the plug or its removal for substitution of another plug.

A pair of handle forming dies 30 are arranged on the inner ends of horizontal shafts 31 on either side of handle 7. Shafts 31 are arranged for sliding movement in sleeves 32 carried by upright members 33 which are fixed to the frame 10. The outer ends of shafts 31 are aligned with the free ends 22 of L-shaped levers 19 so that swinging movement of levers 19 will close the two dies on opposite sides of the handle 7 to punch out the handle into the desired form. Set screws 34 on arms 20 of levers 19 regulate the stroke of shafts 31 so that the dies 30 will be spaced apart any desired distance and will meet to form the handle evenly.

In operation, the lever 13 is rotated counter-clockwise causing lever arms 14 to pull down on the horizontal arms 18 of levers 19 through the links 15. Levers 19 are thus rotated about their pivotal axes 21 so that the arms 20 of levers 19 are moved toward each other. The free ends 22 of arms 20 move shafts 31 inward until the dies 30 cut through the solid handle 7. The dies form the handle into the desired shape, as shown at 8 in Fig. 5, and also cut away the excess portion of the handle from the cup. When the lever 13 is returned by rotation in clockwise direction, the dies 30 are automatically drawn apart by action of any suitable spring mechanism 35. The spring shown therein is for illustrative purposes but any means for automatically retracting the dies may be employed. When the punching operation is completed the handle is sponged to remove any feathery edges of the clay left by the dies.

The machine may be used for different shapes of cups and for forming different shaped handles. This may be accomplished by the substitution of a suitable plug 25 as well as suitable dies 30. The plug may also be raised or lowered for centering the uncut handle 7 with respect to the dies. The dies are removably fitted on the inner ends of shafts 31 in any suitable manner which will permit changing with facility.

I claim:

1. A method of forming a pottery cup and a handle therefor in one piece which comprises moulding plastic material in a single mould to simultaneously form a cup and an integral handle blank projecting laterally from the cup and subsequently subjecting the handle blank, while still in a plastic condition, to a die shaping operation between dies designed to form a finger opening in the handle blank and to simultaneously shear off and shape a peripheral portion of the handle blank to thereby provide a finished handle of predetermined size and peripheral contour.

2. Apparatus for shaping a handle blank moulded integral with a pottery cup comprising a stand, opposing horizontally movable handle shaping dies slidably mounted on said stand in axial alignment with each other, a cup support mounted on the stand at one side of and at a predetermined distance from the path of movement of said dies and adapted to support a pottery cup in an inverted position thereon with the handle blank of the cup disposed between said dies, said dies being adapted to be forced against the interposed handle blank and being shaped to form a finger opening in the handle blank and to simultaneously shear off a peripheral portion of the handle blank to thereby provide a finished handle of predetermined size and peripheral contour, and means for reciprocating said dies into and out of handle shaping engagement with said handle blank.

3. Apparatus as set forth in claim 2, in which said means for reciprocating said dies includes a pair of levers pivotally mounted on said stand at opposite sides of said cup support, each of said levers having an arm freely disposed at the outer end of an adjacent die carrying shaft and movable about its pivotal axis into abutting engagement with the outer end of said die carrying shaft for sliding movement of the latter toward said handle blank and means connected to each of said levers for simultaneous movement of said levers toward the outer ends of said die carrying shafts.

4. Apparatus as set forth in claim 3, including a set screw carried by each of said levers, said set screw being adjustable relative to said lever toward and away from the outer end of the adjacent die carrying shaft to regulate the stroke of said die carrying shaft.

5. Apparatus for shaping a handle blank moulded integral with a pottery cup, comprising a stand, a pair of stationary horizontal sleeves supported on the stand in axial alignment with each other and with the inner ends of the sleeves spaced apart, a reciprocating die shaft slidably mounted in each sleeve, co-operating dies carried by the inner ends of the said die shafts, springs arranged to act against said die shafts to normally maintain the dies in spaced separated relation, means for moving said die shafts toward each other against the resistance of said springs, a cup support mounted on said stand at one side of and at a predetermined distance from the path of movement of said dies to support a cup thereon with the handle blank of the cup disposed between and in the path of movement of said dies, said dies cooperating with each other during inward movement thereof to form a finger opening in the handle blank and to simultaneously shear off a peripheral portion of the handle blank to thereby provide a finished handle of predetermined size and peripheral contour.

6. Apparatus as set forth in claim 5, in which said means for moving the die shafts inwardly comprises a rotary shaft mounted to rotate in fixed bearings carried by said stand, a pair of lever arms having one end fixed to rotate with said shaft, each lever arm having its opposite end pivotally connected to the lower end of a link, said link having its upper end pivotally connected to the outer end of one arm of an L-shaped lever, said L-shaped lever being mounted intermediate its length to rotate about a horizontal axis and having its other arm disposed to freely engage the outer end of one of said die shafts to move said die shaft against the resistance of said spring in response to rotation of said rotary shaft in one direction and to be moved away from the outer end of said die shaft in response to counter-rotation of said rotary shaft.

7. Apparatus for shaping a handle blank moulded integral with a pottery cup comprising a stand, a pair of stationary horizontal sleeves supported on the stand in axial alignment with each other and with the inner ends of the sleeves spaced apart, a reciprocating die shaft slidably mounted in each sleeve, co-operating dies carried by the inner ends of the said die shafts, spring abutments carried by the die shafts in spaced relation to the outer ends of the sleeves, a spring encircling each shaft and confined between the outer end of the sleeve in which the shaft slides and the spring abutment carried by said shaft, means for moving said die shafts toward each other against the resistance of said springs, a cup support mounted on the stand at one side of and at a predetermined distance from the path of movement of said dies, said cup support being shaped to fit within and support an inverted cup thereon with the handle blank of the cup disposed between and in the path of movement of said dies, said dies co-operating with each other during inward movement thereof to form a finger opening in the handle blank and to simultaneously shear off a peripheral portion of the handle blank to thereby provide a finished handle of predetermined size and peripheral contour.

8. A method of forming a pottery cup and handle in one piece which comprises moulding plastic material in a single mould to simultaneously form a cup and integral handle blank projecting laterally from the cup and subsequently while still in a plastic condition reshaping the handle blank by cutting away excess material from the peripheral portion thereof and by forming a finger opening therein by the use of a die thereby to provide a finished handle of predetermined size and peripheral contour integral with the cup.

9. A method of forming a pottery cup and handle in one piece which comprises moulding plastic material in a single mould to simultaneously form a cup and integral handle blank projecting laterally from the cup with the mouth of the cup and the top of the handle blank at the open end of the mould and subsequently while still in a plastic condition reshaping the handle blank by cutting away excess material from the peripheral portion thereof and by forming a finger opening therein by the use of a die thereby to provide a finished handle of predetermined size and peripheral contour integral with the cup.

10. Apparatus for manufacturing appendaged pottery-ware comprising a holder for receiving an unfired pottery article while in plastic condition with attached appendage blank, a pair of co-operable, hole forming and appendage contouring implements, supports for said implements mounted adjacent the holder and arranged for movement relative to the holder and the blank, and means for moving the implement supports, one relative to the other to bring the implements into engagement with the blank to squeeze the handle blank between them, detach the material occupying the hole portion of the blank and remove excess material from and contour the external surface of the appendage.

11. Apparatus for manufacturing appendaged pottery-ware comprising a holder for receiving an unfired pottery article while in plastic condition with integral, projecting appendage blank, a pair of co-operable members each having a hole cutting surface and an appendage contouring surface surrounding it, a support for each member located adjacent the holder and arranged for movement relative to the holder and the blank, and mechanism for moving the supports, one relative to the other, to bring the implements together with the blank between them to cut a finger hole in the blank and remove excess material from and contour the external surface of the blank.

References Cited in the file of this patent

UNITED STATES PATENTS

| Number | Name | Date |
|---|---|---|
| 265,540 | Robinson et al. | Oct. 3, 1882 |
| 1,578,198 | Lannert | Mar. 23, 1926 |
| 1,828,462 | Fry et al. | Oct. 20, 1931 |
| 2,075,038 | Hutchinson | Mar. 30, 1937 |
| 2,349,292 | Miller et al. | May 23, 1944 |